(12) United States Patent
Matsumoto

(10) Patent No.: US 7,850,318 B2
(45) Date of Patent: Dec. 14, 2010

(54) VEHICLE INTERIOR MIRROR DEVICE

(75) Inventor: Yoshiyuki Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/028,290

(22) Filed: Feb. 8, 2008

(65) Prior Publication Data

US 2008/0192370 A1     Aug. 14, 2008

(30) Foreign Application Priority Data

Feb. 13, 2007    (JP)   ............... 2007-032275

(51) Int. Cl.
     *G02B 27/00*     (2006.01)
(52) U.S. Cl. ...................................... 359/613; 359/871
(58) Field of Classification Search ................. 359/602, 359/613, 871

See application file for complete search history.

(56) References Cited

U.S. PATENT DOCUMENTS

| | | | | |
|---|---|---|---|---|
| 5,431,473 A * | 7/1995 | Hiemstra | ................... | 296/97.8 |
| 5,517,367 A * | 5/1996 | Kim et al. | ................... | 359/864 |
| 5,641,191 A * | 6/1997 | Jia | ............................. | 296/97.6 |
| 5,748,395 A * | 5/1998 | Rendi, Jr. | ................... | 359/841 |
| 2004/0051378 A1 * | 3/2004 | Bauer et al. | ................ | 307/10.1 |

FOREIGN PATENT DOCUMENTS

JP      2006-142892      6/2006

\* cited by examiner

*Primary Examiner*—Joshua L Pritchett
(74) *Attorney, Agent, or Firm*—Rankin, Hill & Clark LLP

(57) ABSTRACT

A vehicle interior mirror device disposed in a passenger compartment for reflecting a state of rear seats and traffic conditions behind a vehicle. The interior mirror device has reflection restricting means notched in a lower end of the interior mirror device to prevent a face of a passenger from being reflected, so that eyes of passengers seated in seats other than the driver's seat do not meet.

3 Claims, 6 Drawing Sheets

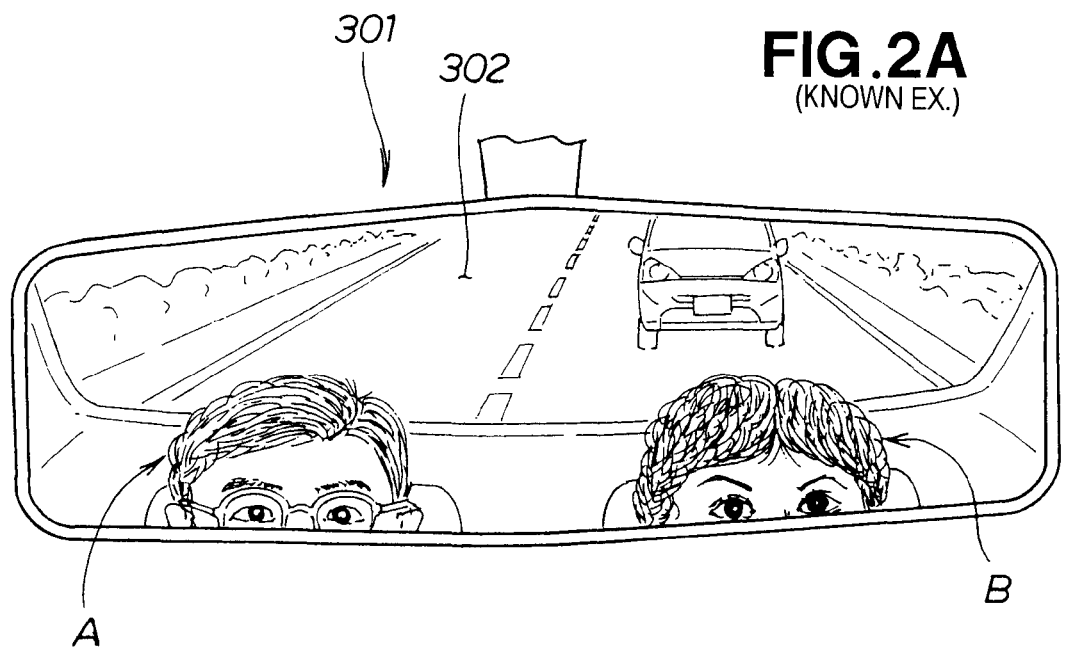
FIG.2A (KNOWN EX.)
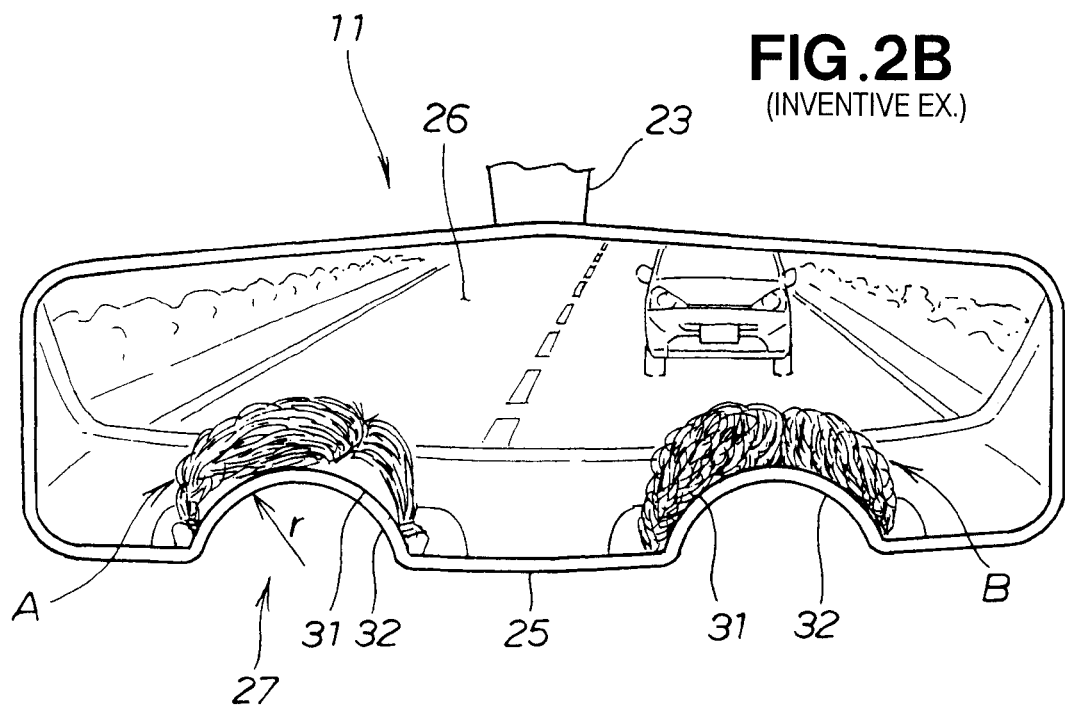
FIG.2B (INVENTIVE EX.)

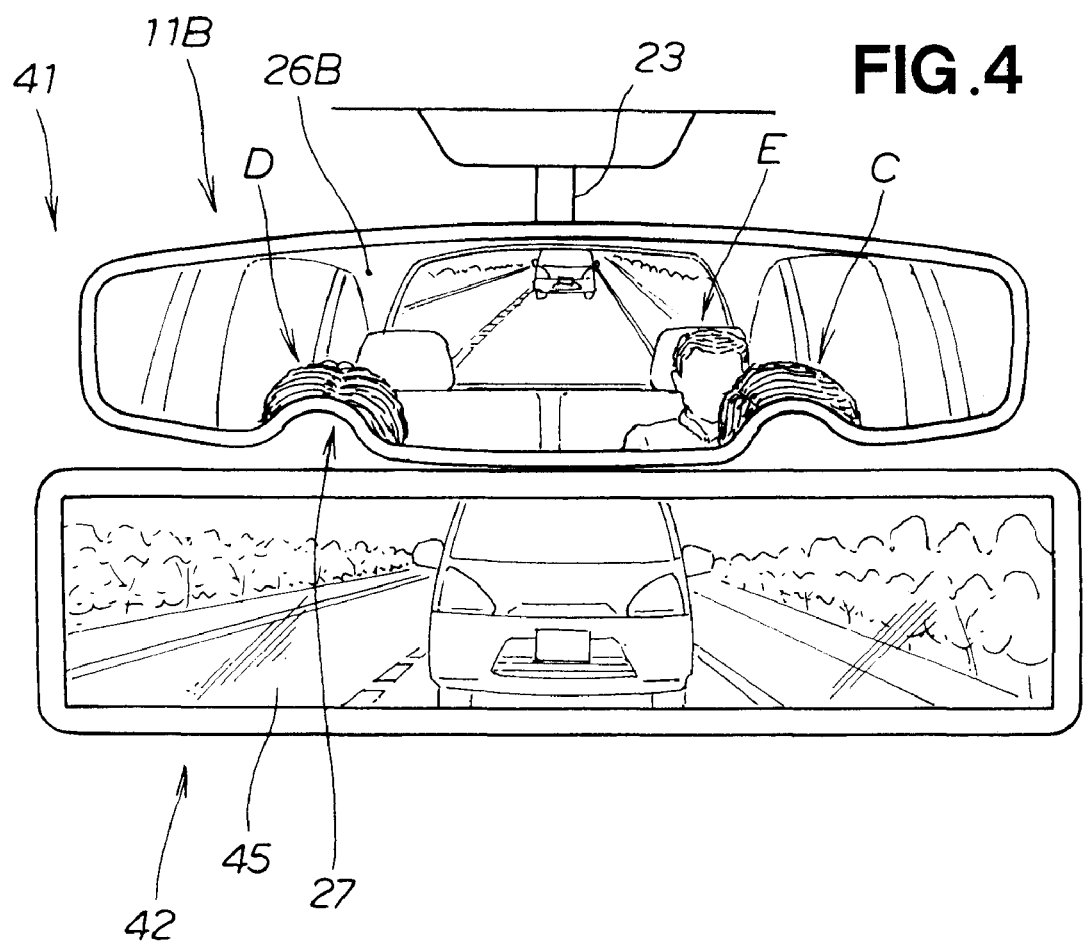

VEHICLE INTERIOR MIRROR DEVICE

FIELD OF THE INVENTION

The present invention relates to a vehicle interior mirror device which is adapted to restrict the range of reflected images.

BACKGROUND OF THE INVENTION

Japanese Patent Application Laying-Open Publication No. 2006-142892 (JP 2006-142892 A) discloses a vehicle interior mirror device for confirming the conditions in the rear seats. The disclosed vehicle interior mirror device will be described below with reference to FIG. 6 hereof.

As shown in FIG. 6, the interior mirror device 201 includes a housing body 202 and a lid for covering the storage space of the housing body 202, which lid is divided into a first lid 203 and a second lid 204. A mirror 205 is disposed on the second lid 204 for confirming the conditions of the back seats.

However, with the interior mirror device 201 described above, there is a problem in that the eyes of passengers or occupants reflected in the mirror 205 meet when the condition of the occupants in the rear seat is confirmed, and some people may have concern about being watched and feel discomfort.

For example, a child seated in a rear seat is reflected in the mirror 205 and the face, posture and other conditions can be seen, but the face of a person other than the child seated in the seat adjacent to the child is reflected in the mirror 205 at the same time, eye contact is made with the person reflected in the mirror, and relatively large number of people feel uncomfortable with such a circumstance.

A similar situation also occurs with a common interior mirror device other than the mirror 205 described above. When traffic conditions behind the vehicle are ascertained in the interior mirror device, the faces of the occupants in the rear seats and, more particularly, the eyes are reflected together with the conditions. As a consequence, there is a problem in that the eyes will meet and there are a relatively large number of people who feel discomfort.

SUMMARY OF THE INVENTION

It is therefore an object of the present invention to provide a vehicle interior mirror device in which the eyes of the occupants seated in a seat other than the driver's seat do not meet, undue discomfort is not felt or imparted, the passenger compartment can be surveyed, and the state of the passenger compartment can be confirmed.

According to a first aspect of the present invention, there is provided a vehicle interior mirror device adapted to adjust a range of reflected images, which device comprises: reflection restricting means for restricting formation of unnecessary images among the images.

When the rearward direction is reflected by the interior mirror, unnecessary images in the rearward direction, e.g., images of the occupants are prevented by the reflection restricting means from being reflected in the mirror of the interior mirror. As a result, the eyes of the occupants seated in seats other than the driver's seat of the vehicle do not meet, undue discomfort is not felt or imparted, the passenger compartment can be surveyed, and the state of the passenger compartment can be confirmed.

Preferably, the interior mirror device is configured such that a face of a passenger in a passenger compartment is reflected in a peripheral portion of a mirror of the mirror device, and the reflection restriction means is disposed in correspondence with a portion in which the passenger face is reflected in the mirror. With this arrangement, the face of a passenger or occupant is not reflected in the mirror when the interior mirror is set at an angle at which the faces of the occupants are not reflected together.

Desirably, the reflection restricting means comprises a shielding member superimposed on a mirror of the mirror device, and moving means disposed proximately to the mirror, for movably supporting the shielding member. With this arrangement, the shielding member can be moved by the moving means, and the position of the shielding member can therefore be moved so as to correspond to the physical size and driving posture of the driver so that the faces reflected in the mirror are hidden.

According to a second aspect of the present invention, there is provided a vehicle interior mirror device, which comprises: a mirror; and reflection restricting means formed on the mirror such that a face of a passenger in a passenger compartment is not reflected in the mirror.

It is preferred that the mirror be held by a frame-shaped holding section.

In a preferred form, the reflection restricting means is comprised of a plurality of notched sections formed in lower ends of the mirror and the holding section. With this arrangement, the faces of occupants positioned rearward of the driver are not reflected in the notched sections.

It is preferred that the reflection restricting means be comprised of a plurality of shielding members positioned on a front surface of the mirror, and moving means for supporting the shielding members movably along a lower end of the holding section.

According to a third aspect of the present invention, there is provided a vehicle interior mirror device, which comprises: a first interior mirror member having a first holding frame, a first mirror held inside the first holding frame, and reflection restricting means formed on the first holding frame and the first mirror member such that a face of a passenger in a passenger compartment is not reflected in the first interior mirror member; and a second interior mirror member disposed below the first interior mirror member and having a second mirror held inside a second holding frame.

It is preferred that the first mirror be comprised of a convex mirror, and the second mirror be comprised of a flat mirror. The interior of the passenger compartment is reflected by the first mirror, and conditions behind the vehicle are reflected in the second mirror.

BRIEF DESCRIPTION OF THE DRAWINGS

Certain preferred embodiments of the present invention will be described in detail below, by way of example only, with reference to the accompanying drawings, in which:

FIGS. 2A and 2B are schematic views illustrating a conventional vehicle interior mirror as compared to the inventive vehicle interior mirror of FIG. 1;

FIG. 4 is a schematic view illustrating an example use of the interior mirror shown in FIG. 3A;

DETAILED DESCRIPTION OF THE PREFERRED EMBODIMENTS

Figure 1:
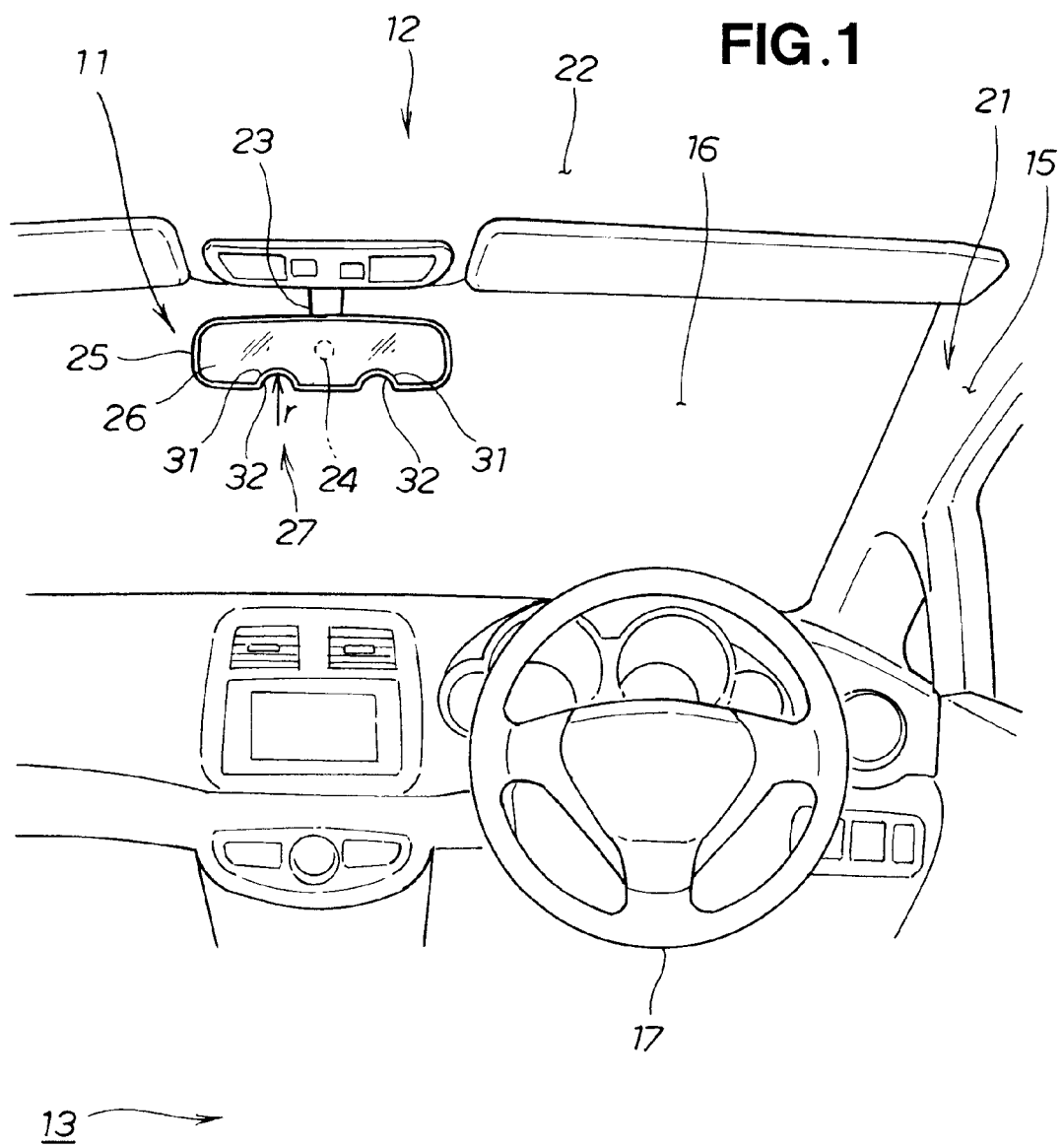
FIG. 1 is a schematic view illustrating an interior mirror according to a first embodiment of the present invention, which is mounted to a predetermined position in a passenger compartment of a vehicle.

A vehicle interior mirror device 11 according to the first embodiment shown in FIG. 1 is disposed inside a passenger compartment 13 of a vehicle 12 and is an inside mirror that a driver uses to confirm the vehicles in the rearward direction. In the drawing, 15 is a front pillar, 16 is a front windshield that is mounted on the pillar 15, and 17 is a steering wheel.

The vehicle interior mirror device 11 has a support section 23 that is mounted in the front portion of the passenger compartment 13 and on a roof 22 of a vehicle body 21, an adjustment section 24 disposed at a distal end of the support section 23 (see FIG. 5B), a holding section 25 mounted on the adjustment section 24, a mirror 26 held by the holding section 25, and reflection restricting means 27.

The support section 23 has an impact cushioning mechanism, and the impact cushioning mechanism cushions the impact on occupants or passengers.

The adjustment section 24 is a location that rotatably supports the holding section 25 so that the angle of the mirror 26 can be adjusted.

The mirror 26 is a flat mirror.

The reflection restricting means 27 has a first notched section 31 formed in the mirror 26, and a second notched section 32 that corresponds to the first notched section 31 and is formed in the holding section 25.

The first notched section 31 is a location at which a portion that reflects the face of the occupant in the passenger compartment is removed at a radius r.

FIG. 2A is the vehicle interior mirror device 301 that corresponds to a known example mirror device. FIG. 2B is the vehicle interior mirror device 11 according to a first embodiment shown in FIG. 1.

FIGS. 2A and 2B are a comparison of cases in which the eyes of the driver meet or do not meet the eyes of the occupants in the passenger compartment when the angle of the mirror is adjusted so that the primary section is reflected and the driver confirms the rearward direction (including the interior of the passenger compartment) using the image reflected in the mirror, with the driver being used as a reference.

With the known example vehicle interior mirror device 301 of FIG. 2A, the condition in the passenger compartment can be confirmed when the driver looks at the mirror 302, but the eyes of occupant A and occupant B in the passenger compartment meet.

With the vehicle interior mirror device 11 according to the first embodiment in FIG. 2B, the condition in the passenger compartment can be confirmed when the driver looks at the mirror 26, and the eyes of occupant A and occupant B in the passenger compartment do not meet.

In this manner, the reflection restricting means 27 that restricts the formation of unnecessary images among the reflected images is provided to the vehicle interior mirror device 11. Therefore, the reflection restricting means 27 can be used to prevent the eyes of the occupants seated in seats other than the driver's seat of the vehicle 12 from meeting and the occupants from feeling or imparting undue discomfort, the passenger compartment can be surveyed, and the state of the passenger compartment can be confirmed.

The interior mirror device 11 is configured so that the rearward direction of the vehicle 12 and the faces of the occupants A and B in the passenger compartment reflect in the peripheral section of the mirror. The reflection restricting means 27 is disposed in correspondence with the face portion of the occupants A and B in the passenger compartment. Therefore, the reflection restricting means 27 does not reflect the faces and, more particularly, the eyes of the occupants A and B. As a result, the eyes of the occupants seated in seats other than the driver's seat of the vehicle are prevented from meeting, the occupants are prevented from feeling or imparting undue discomfort, the passenger compartment can be surveyed, and the state of the passenger compartment can be confirmed.

Figure 3A:
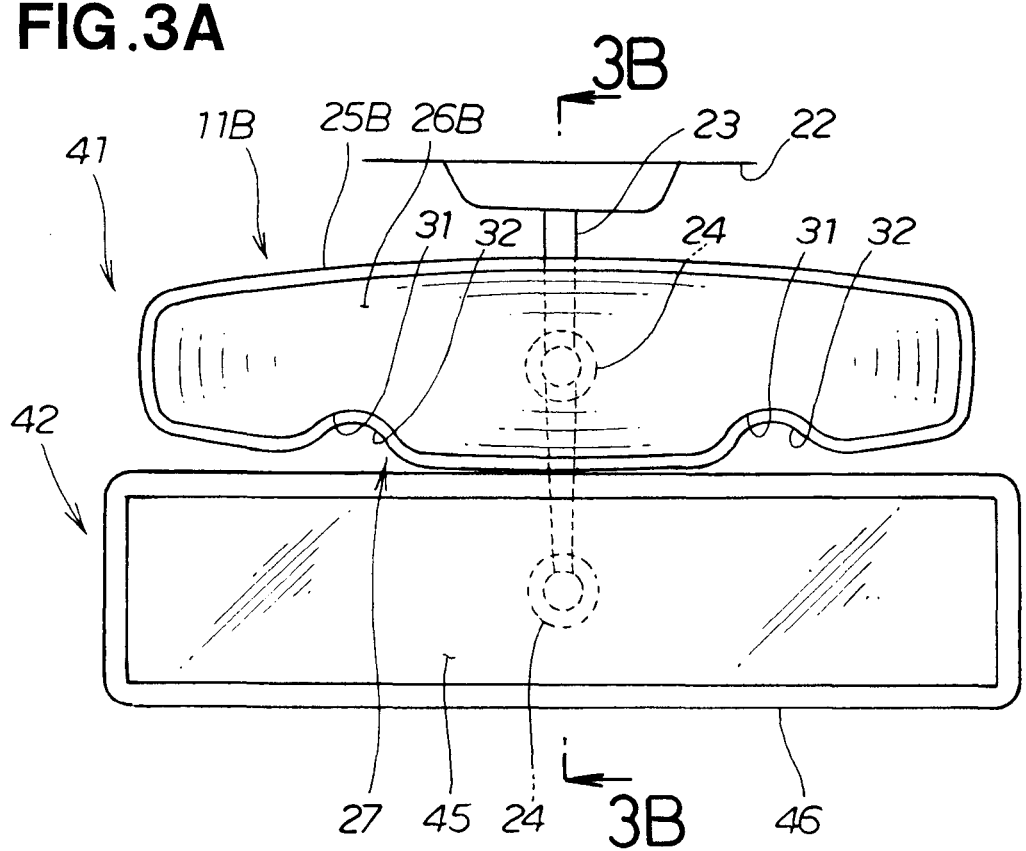
FIGS. 3A and 3B are schematic views illustrating a vehicle interior mirror according to a second embodiment of the present invention.
Figure 3B:
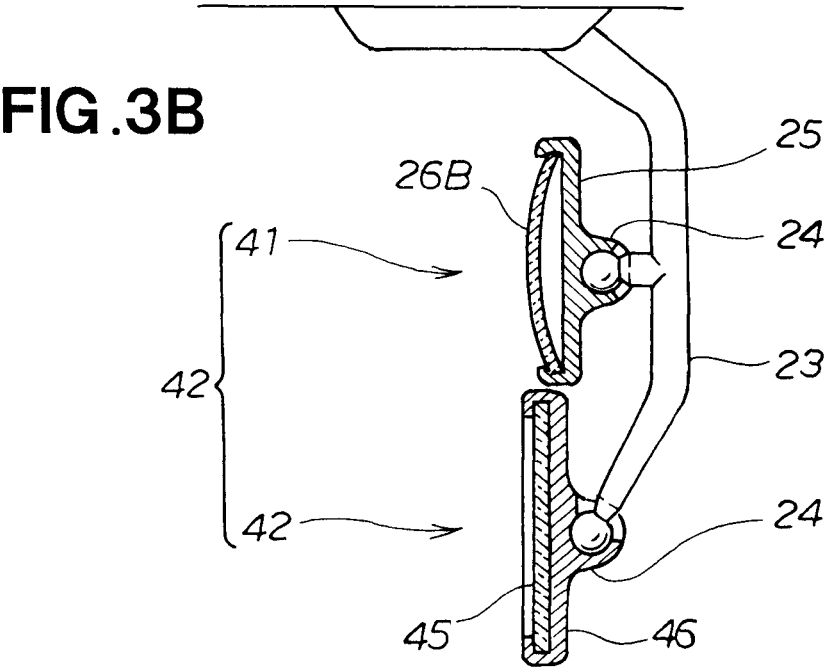

FIGS. 3A, 3B, and 4 show the vehicle interior mirror device 41 according to a second embodiment. The same reference numerals are used for the same configuration as the vehicle interior mirror device 11 according to the first embodiment shown in FIG. 1, and a description thereof is omitted.

The vehicle interior mirror device 41 according to the second embodiment has a first interior mirror member 11B and a second interior mirror member 42 disposed below the first interior mirror member 11B.

The first interior mirror member 11B has a first mirror 26B, a frame-shaped holding section 25B that holds the first mirror 26B, and reflection restricting means 27.

The first mirror 26B is a convex mirror.

The second interior mirror member 42 has a second mirror 45, and a frame-shaped holding section 46 that holds the second mirror 45.

The second mirror 45 is a flat mirror.

The case in which three people are riding will be described as an example in the second embodiment shown in FIG. 4. In the case of three occupants in the passenger compartment, i.e., a driver C, a passenger D sitting in the front passenger seat, and a passenger E sitting in the back right seat (behind the driver seat), the image of the driver C, the passenger D sitting in the front passenger seat, and the passenger E sitting in the back right seat is reflected in the first mirror 26B of the vehicle interior mirror member 11B.

The image of the occupant E is reflected minimally, even though the occupant E in the back seat is reflected in the vehicle interior mirror member 11B. Thus, it is difficult to see the eyes of the occupant E in the back seat, and undue discomfort is not experienced by or imparted to the occupant E in the back seat.

The first mirror 26B is a convex mirror in the vehicle interior mirror member 11B according to the second embodiment. Therefore, the entire passenger compartment 13 can be surveyed and the reflection of the occupants C and D in the front seat in the passenger compartment is restricted by the reflection restricting means 27, whereby the eyes of the occupants D and C in the front seat in the passenger compartment do not meet.

In other words, the interior of the passenger compartment can be surveyed and the condition in the passenger compartment can be confirmed without the eyes of the occupants seated in seats other than the vehicle driver's seat meeting, and without feeling or imparting undue discomfort.

The angle of the second mirror 45 is adjusted so that the rearward automobile is mainly reflected in the second mirror 45 of the second interior compartment mirror 42, whereby the rearward reflected range is substantially limited to the rearward automobile, and although the confirmation range is narrow, the condition of the rearward automobile can be comfortably confirmed without concern for the eyes of the occupant.

Figure 5A:
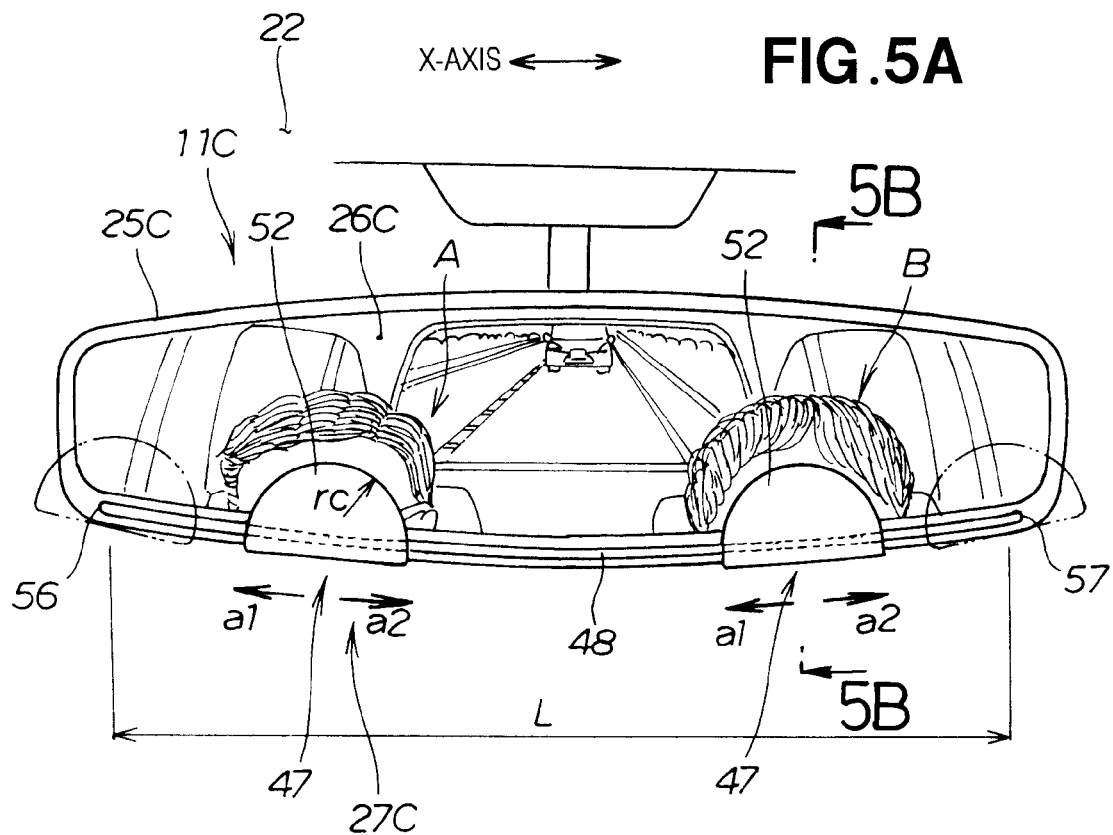
FIGS. 5A and 5B are schematic views illustrating a vehicle interior mirror according to a third embodiment of the present invention.
Figure 5B:
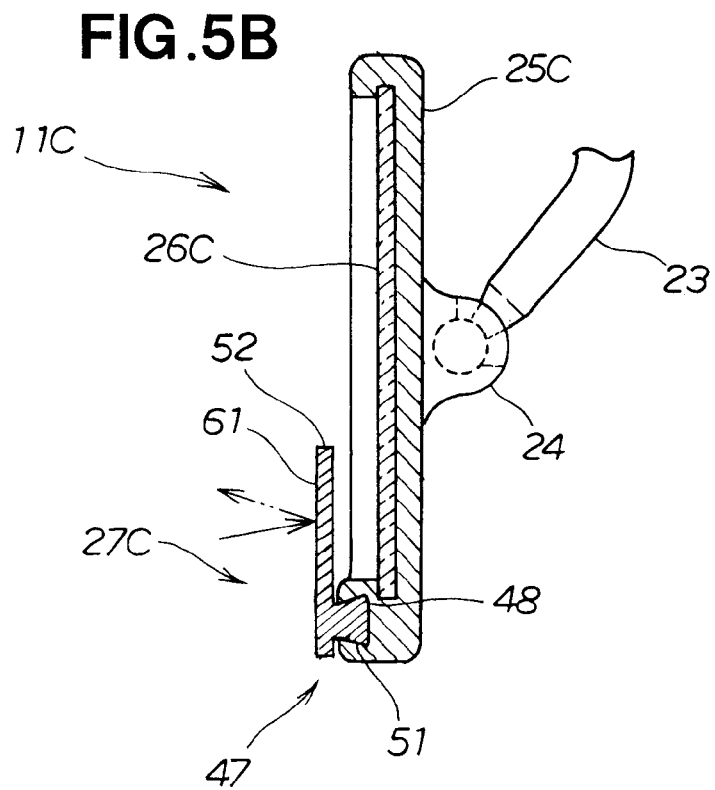
Figure 6:
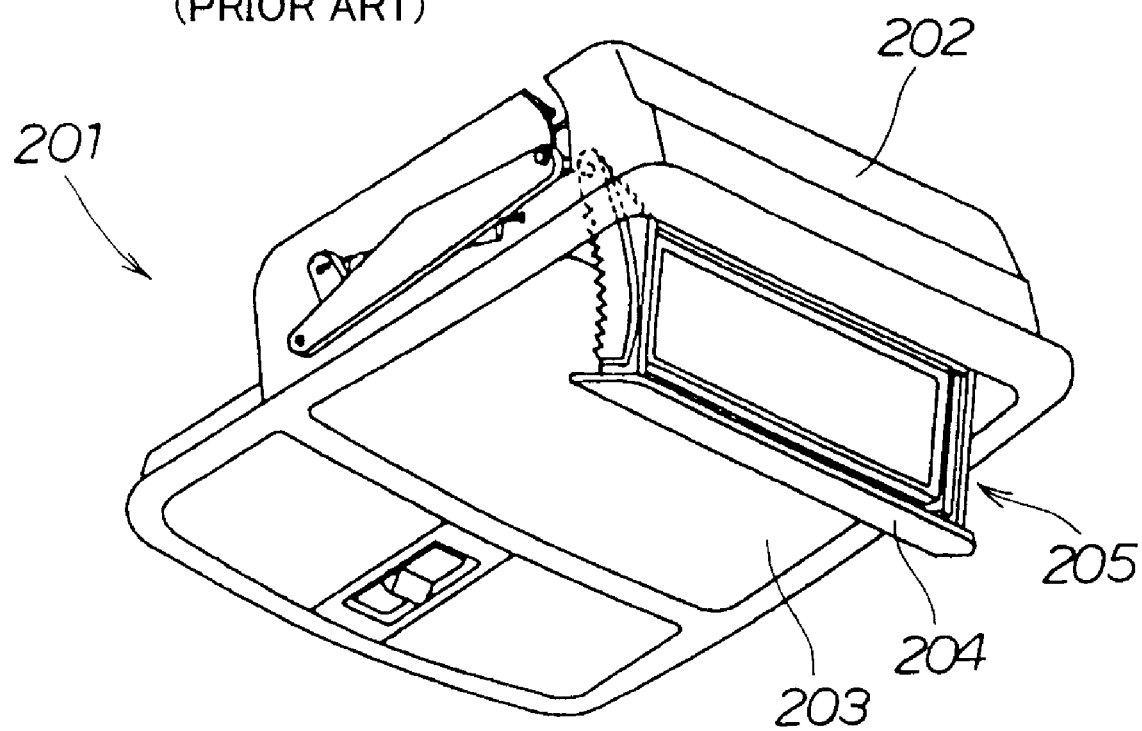
FIG. 6 is a schematic perspective view illustrating a conventional vehicle interior mirror.

FIGS. 5A and 5B show a vehicle interior mirror device 11C according to a third embodiment. The same reference numerals are used for components similar to those of the first embodiment of FIG. 1, and a description thereof is omitted.

The vehicle interior mirror device 11C according to the third embodiment has a holding section 25C for holding a mirror 26C, and reflection restricting means 27C that has moving means 47 provided to the holding section 25C.

The mirror 26C is a flat mirror. The shape of the mirror surface is arbitrary.

The reflection restricting means 27C is a component in which a guide rail groove 48 is formed in the holding section 25C, the guide rail groove 48 is formed in a trapezoidal shape in cross section along the edge of the mirror 26C, a slider section 51 is slidably fitted in the guide rail groove 48, shielding members 52 are integrally formed in the slider section 51, the shielding members 52 are fixed to the guide rail groove 48 by the sliding resistance of the sliding section 51, and reflection is prevented by the shielding members 52.

The moving means 47 is composed of the guide rail groove 48 and the slider section 51.

The guide rail groove 48 has a leader 56 at one end (left end) of the mirror 26C, has a terminal end 57 at the other end (right end) of the mirror 26C, and has a length L that substantially matches the length of the mirror 26C in a lengthwise direction (x-axis direction).

The length of the guide rail groove 48 is arbitrary and can be formed along the entire periphery of the mirror 26C.

The guide rail groove 48 is cut into the holding section 25C. However, a component that corresponds to the guide rail groove 48 may be formed using a member that is separate from the holding section 25C, and it is also possible to provide a rail (not shown) in which a tube is bent along the edge of the mirror 26C. As a result, an existing mirror (interior mirror device) can be used and mass production effect can be achieved.

The shielding members 52 have the shape of a substantially bisected disk and is formed so that a surface 61 does not reflect light, as shown by the alternate long and two short dashes line.

The shielding members 52 are formed with a radius rc as viewed from the front (viewpoint of FIG. 5A), and may have any shape. In other words, the shape may be one in which the reflected face is hidden, and more particularly, one in which the reflected eyes are hidden, e.g., a triangular shape.

Two shielding members 52 are provided, but three or more shielding members may be provided, and the number of shielding members 52 is arbitrary.

Next, an operation of the reflection restricting means 27C will be briefly described.

First, the driver adjusts the angle of the mirror 26C. At this time, the angle of the mirror 26C is set so that a wide range of the rearward condition can be confirmed. Next, occupants A and B who are reflected in the mirror 26C are hidden by the shielding members 52. The shielding members 52 are moved against the sliding resistance of the slider section 51. The shielding members 52 are made to slide to the left (direction of arrow a1) or right (direction of arrow a2), and are superimposed on the reflected faces of the occupants A and B. Position adjustment of the shielding members 52 is thereby completed.

The vehicle interior mirror device 11C according to the third embodiment demonstrates the same effect as the vehicle interior mirror device 11 according to the first embodiment. In other words, reflection of the occupants A and B in the passenger compartment is restricted by the reflection restriction means 27C, whereby the eyes of the occupants A and B in the passenger compartment do not meet.

In other words, the eyes of the occupants seated in a seat other than the driver's seat of the vehicle do not meet, undue discomfort is not felt or imparted, the passenger compartment can be surveyed, and the state of the passenger compartment can be confirmed.

The vehicle interior mirror device 11C is configured so that the shielding members 52 can be moved (the direction of arrow a1 or the direction of arrow a2) so as to hide the faces and eyes that are reflected in the mirror 26C when the position of the viewpoint of the driver has changed based on the physical size and driving posture of the driver. In other words, the faces reflected in the mirror 26C can be hidden in relation to the position (view point) of the seats in accordance with personal preference.

In addition, the vehicle interior mirror device 11C may be configured so that the shielding members 52 can be slid (the direction of arrow a1 or the direction of arrow a2) to a position of an image other than the eyes that the driver desires to hide from among the reflected images, and to hide an image reflected in the mirror 26C that the driver desires to hide.

In this manner, with the vehicle interior mirror device 11C according to the third embodiment, the reflection restricting means 27C is provided with the shielding members 52 that are superimposed on the mirror 26C of the interior mirror device 11C, and moving means 47 that movably supports the shielding members 52 and is disposed near the mirror 26c. Therefore, the shielding members 52 can be moved so as to correspond with the position (view point) of an individual seat, and the position of the shielding members 52 can be made to correspond to the physical size and driving posture of the driver.

The vehicle interior mirror device according to the present invention is used in a vehicle, but application can also be made to roads, inside stores, and other locations in which a mirror is used.

The shape of the mirror surface is arbitrary.

The shape of the mirror is arbitrary and may be a circle.

Obviously, various minor changes and modifications of the present invention are possible in light of the above teaching. It is therefore to be understood that within the scope of the appended claims the invention may be practiced otherwise than as specifically described.

What is claimed is:

1. A vehicle rearview mirror, comprising:
a mirror having an upper end, a lower end and opposed sides; and
reflection restricting means located on the lower end of the mirror such that a face of a passenger in a passenger compartment is not reflected in the mirror,
wherein the mirror is held by a frame-shaped holding section around a periphery thereof and the reflection restricting means comprises a plurality of notched sections formed in lower ends of the mirror and the holding section.

2. A vehicle interior mirror device, comprising:
a first interior mirror member having a first holding frame, a first mirror held inside the first holding frame, and reflection restricting means formed on the first holding frame and the first mirror member such that a face of a passenger in a passenger compartment is not reflected in the first interior mirror member; and
a second interior mirror member disposed below the first interior mirror member and having a second mirror held inside a second holding frame,
wherein the reflection restricting means comprises a plurality of notched sections formed in lower ends of the first holding frame and the first mirror.

3. The mirror device of claim 2, wherein the first mirror comprises a convex mirror, while the second mirror comprises a flat mirror.

* * * * *